United States Patent
O'Brien

(10) Patent No.: US 7,155,223 B2
(45) Date of Patent: Dec. 26, 2006

(54) OPTIMIZING HAND-OFF NEIGHBOR LISTS FOR IMPROVED SYSTEM PERFORMANCE

(75) Inventor: Paul S. O'Brien, Dallas, TX (US)

(73) Assignee: Nortel Networks Limited, St. Laurent ( * ) Notice: Subject to any disclaimer, the term of this patent is extended or adjusted under 35 U.S.C. 154(b) by 378 days.

(21) Appl. No.: 10/326,362

(22) Filed: Dec. 20, 2002

(65) Prior Publication Data

US 2004/0121773 A1 Jun. 24, 2004

(51) Int. Cl.
*H04Q 7/20* (2006.01)

(52) U.S. Cl. .............. 455/436; 455/437; 455/438; 455/439; 455/440; 455/441; 455/442; 455/443; 370/331

(58) Field of Classification Search ........... 455/433, 455/436, 443, 438, 437, 439, 440, 441, 442, 455/444, 445; 370/328, 331, 352, 329, 330; 330/351
See application file for complete search history.

(56) References Cited

U.S. PATENT DOCUMENTS

| | | | | |
|---|---|---|---|---|
| 5,854,981 A * | 12/1998 | Wallstedt et al. | ........... | 455/439 |
| 5,946,621 A * | 8/1999 | Chheda et al. | .............. | 455/440 |
| 5,953,320 A * | 9/1999 | Williamson et al. | ........ | 370/252 |
| 5,982,758 A * | 11/1999 | Hamdy | ........................ | 370/331 |
| 6,119,005 A * | 9/2000 | Smolik | ........................ | 455/436 |
| 6,195,342 B1 * | 2/2001 | Rohani | ........................ | 370/331 |
| 6,201,968 B1 * | 3/2001 | Ostroff et al. | .............. | 455/436 |
| 6,321,087 B1 * | 11/2001 | Do | ............................. | 455/436 |
| 6,360,098 B1 * | 3/2002 | Ganesh et al. | .............. | 455/436 |
| 6,430,414 B1 * | 8/2002 | Sorokine et al. | ............ | 455/442 |
| 7,082,305 B1 * | 7/2006 | Willars et al. | .............. | 455/441 |
| 2003/0078043 A1 * | 4/2003 | Horwath et al. | ........... | 455/436 |
| 2003/0190916 A1 * | 10/2003 | Celedon et al. | ............. | 455/437 |
| 2003/0203735 A1 * | 10/2003 | Andrus et al. | ............. | 455/450 |
| 2004/0142699 A1 * | 7/2004 | Jollota et al. | ............ | 455/452.2 |

* cited by examiner

*Primary Examiner*—Joseph Feild
*Assistant Examiner*—Olumide Ajibade-Akonai
(74) *Attorney, Agent, or Firm*—Slater & Matsil, L.L.P.

(57) ABSTRACT

Method for improving hand-off performance in a code-division multiple access (CDMA) cellular telephone system. A preferred embodiment comprises the analysis of saved hand-off information to minimize the size of neighbor lists for each base station in the cellular telephone system. If a requested base station (for example, base station 618) is listed in any neighbor list of any base station (for example, base stations 605, 617, and 620) involved in the hand-off, then the requested base station is not added to any neighbor list. If the requested base station is not the neighbor lists of any of the base stations involved in the hand-off, then it is added to an initial base station's neighbor list (base station 605).

21 Claims, 10 Drawing Sheets

OPTIMIZING HAND-OFF NEIGHBOR LISTS FOR IMPROVED SYSTEM PERFORMANCE

TECHNICAL FIELD

The present invention relates generally to a method for optimizing performance in a cellular telephone system, and more particularly to a method for optimizing a mobile unit hand-off between a plurality of base stations via the use of an optimized neighbor list in each of the base stations.

BACKGROUND

Generally, when a mobile cellular telephone unit moves around within the coverage area of the cellular telephone system, it will exit the effective coverage area of one base station(s) and enter the effective coverage area of another base station(s). (A base station is also sometimes referred to as a cell-site. The base stations in a cellular telephone system are used to control the communications links from the mobile cellular telephone units and to provide access to the public-switched telephone network.) To provide uninterrupted service, the control of the mobile cellular telephone unit must be passed from base station(s) with the effective coverage area that the mobile cellular telephone unit is exiting and to the base station(s) with the effective coverage area that the mobile cellular telephone unit is entering. This transfer of control is commonly referred to as a hand-off.

There are typically two different types of hand-offs, a hard hand-off and a soft hand-off. Hard hand-offs involve the termination of the control via the base station(s) from the exited effective coverage area prior to the establishment of the control via the base station(s) with the entered effective coverage area. Hard hand-offs can result in the unexpected termination of an existing communications link with the mobile cellular telephone unit if the control with the base station(s) of the entered effective coverage area is not established in a timely manner. Alternatively, soft hand-offs permit a mobile cellular telephone unit to connect to multiple base stations. By simultaneously connecting to multiple base stations, the quality of the communications link is improved. Additionally, since the mobile cellular telephone unit is simultaneously connected to multiple base stations, it is possible for one or more of these base stations to drop off as the mobile cellular telephone unit moves without disconnecting the communications link.

In a code-division multiple access (CDMA) cellular telephone system, both hard and soft hand-offs are permitted. Both soft and hard hand-offs are controlled by a neighbor list. Each base station in the CDMA cellular telephone system has a neighbor list. The neighbor list of a base station is a list of pilot channels of base stations that the mobile cellular telephone unit may handoff to. The mobile cellular telephone unit is continually searching for potential handoff candidates. The searching algorithm focuses on the base stations defined in the neighbor list, in particular a candidate set in the neighbor list. However, the searching algorithm does search all possible pilot channels. Poor quality pilot channels are dropped automatically and good pilot channels are added (if permitted). Ideally, the neighbor list is kept small so that potential pilot channels can be scanned quickly.

The use of the neighbor list can help reduce the time required to search for pilot channels because the neighbor list effectively informs the mobile which pilot offsets should be searched first. To scan all possible pilot channels can take a considerable amount of time and the neighbor list prioritizes the search order for the mobile cellular telephone unit (potentially saving it a lot of time). Once the mobile cellular telephone unit finds a pilot channel (or a plurality of pilot channels) of sufficient strength, the mobile cellular telephone unit can initiate a soft hand-off. In a CDMA cellular telephone system, if a mobile cellular telephone unit is under the control of a plurality of base stations (when there are more than one control links established with different base stations), the quality of the communications channel tends to increase due to the use of signal combining techniques similar to multi-path combining.

When a mobile cellular telephone unit is communicating with a single base station and it requests hands off to another base station, this is commonly referred to as a one-way hand-off. When a hand-off involves two base stations requesting a third, it is commonly referred to as a two-way hand-off. In general, when a mobile cellular telephone unit is communicating with N base stations and requests an N+1 base station, it is performing an N-way hand-off. When a hand-off involves different sectors of a single base station, this is commonly referred to as a softer hand-off.

In a majority of cases, the neighbor list for each base station is created by having a scanner at various places within the base station's effective coverage area detecting as many pilot channels as it can. The scanner detects pilot channels by scanning for pseudo-random number (PN) sequences. Each base station's pilot channel (within a local area) should have a unique PN sequence, although system wide, a single PN sequence may be used by several different base stations. Then, all of the pilot channels are placed in the base station's neighbor list. This method of neighbor list creation ensures that every pilot channel that is detectable within a give base station's effective coverage area is in the neighbor list.

One disadvantage of the prior art is that by placing every detectable pilot channel in the neighbor list, the neighbor list becomes unnecessarily large. A neighbor list that is too large results in an increase in the amount of time that it takes for a mobile cellular telephone unit to search for a pilot channel. This can increase the chance of a communications link being disconnected if a new control link is not established prior to the mobile cellular telephone unit exits the effective coverage area of the base station(s) to which it is currently linked. A problem related to this is that by the time the mobile cellular telephone unit gets around to measuring a particular PN sequence that may or may not correspond to a pilot channel in the neighbor list, it may have become so strong that it has become an interferer and may cause the call to drop.

A second disadvantage of the prior art is that by placing every detectable pilot channel in the neighbor list, it is possible to have multiple pilot channels with the same PN sequence, but associated with different base stations in the neighbor list. This results in ambiguity as to from which base station the pilot channel is being transmitted. This confusion can prevent a hand-off from taking place and may result in the call to drop.

A third disadvantage of the prior art is that by having every detectable pilot channel in the neighbor list, the resulting neighbor list may exceed the neighbor list storage capacity of the mobile cellular telephone unit. This may result in the inclusion of poor hand-off candidates in a portion of the neighbor list stored in the mobile cellular telephone unit while good candidates are excluded due to lack of storage space.

SUMMARY OF THE INVENTION

These and other problems are generally solved or circumvented, and technical advantages are generally achieved, by preferred embodiments of the present invention which optimizes the neighbor list for each base station in a cellular telephone system by parsing a recorded database of successful hand-offs and creating a neighbor list from the successful hand-offs and not by simply placing every detectable pilot channel into the neighbor list.

In accordance with a preferred embodiment of the present invention, a method for creating a neighbor list for use in hand-offs in a cellular communications system comprising: determining a requested base station, a reference base station, and a list of other base stations from a saved call, determining if the requested base station is present in a neighbor list of a base stations listed in the list of other base stations, and adding the requested base station to a neighbor list for an optimal base station if the requested base station is absent from neighbor lists of the reference base station and all base stations listed in the list of other base stations.

In accordance with another preferred embodiment of the present invention, a method for optimizing a neighbor list comprising selecting a saved call from a list of saved calls, determining a requested base station, a reference base station, and a list of other base stations from the saved call, determining if the requested base station is present in a neighbor list of a base stations listed in the list of other base stations, adding the requested base station to a neighbor list for an optimal base station if the requested base station is absent from neighbor lists of the reference base station and all base stations listed in the list of other base stations, and repeating for all remaining saved calls in the list of saved calls.

In accordance with yet another preferred embodiment of the present invention, a method for populating a neighbor list comprising determining a requested base station, a reference base station, and a list of other base stations from call data, searching each base station's neighbor list for an occurrence of the requested base station, wherein each base station is from the list of other base stations, searching the reference base station's neighbor list for an occurrence of the requested base station, and adding the requested base station to an optimal base station's neighbor list if all searches are negative.

An advantage of a preferred embodiment of the present invention is that by scanning a database of requested hand-offs in the creation of the neighbor list for any given base station, the neighbor list will only consist of pilot channels of other base stations that were strong enough to be involved with a hand-off. This results in a smaller neighbor list.

A further advantage of a preferred embodiment of the present invention is that the neighbor list will not include any pilot channels from other base stations that are already present in the neighbor list of base stations already in its neighbor list. This again helps to keep the neighbor list small.

Yet another advantage of a preferred embodiment of the present invention is that by validating composite requested hand-offs in the generation of neighbor lists, the neighbor lists are kept small, minimizing the potential of a single neighbor list containing several pilot channels which use the same PN sequence.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a Code-Division Multiple Access (CDMA) cellular telephone system. The invention may also be applied, however, to cellular communications systems and not just cellular telephone systems. Wherein the main difference between a communications system and a telephone system being that the communications system can be used to transport data (such as video, multimedia, and computer information) as well as voice. The invention also has applications to other cellular communications systems such as systems that are variants of CDMA such as IS95 and IS2000, Universal Mobile Telecommunications Systems (UMTS), $3^{rd}$ Generation Mobile Group (3GPP) compliant systems, etc.

Figure 1:
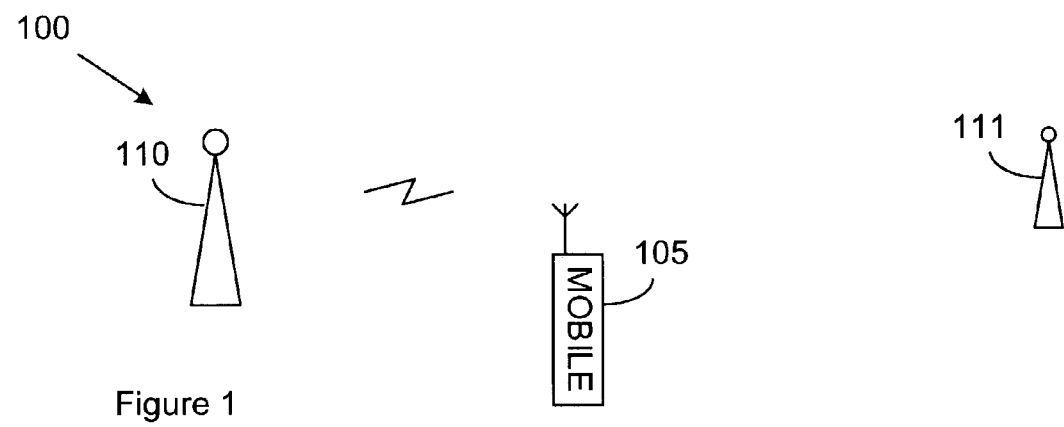
FIG. 1 is a diagram illustrating an exemplary code-division multiple access (CDMA) cellular system.

With reference now to FIG. 1, there is shown a diagram illustrating an exemplary Code-Division Multiple Access (CDMA) cellular telephone system 100 with a mobile cellular telephone unit (mobile) 105 communicating with a base station 110. The mobile 105 is communicating with some device (not shown) through the base station 110 while a second base station 111 is operating at a distance and is not involved with the mobile 105. The device may be another cellular telephone that is a part of the same CDMA system, another cellular telephone that is a part of a different cellular telephone system, or a land-line telephone. The second base station 111 may be too far away from the mobile 105 so that its pilot channel is not of sufficient strength to be measured by the mobile 105. If the second base station 111 is sufficiently close to the mobile 105 so that its pilot channel may be detected and if the base station 111 meets certain hand-off requirements (as specified in the CDMA technical standards), the mobile 105 will attempt to hand-off to the second base station 111.

Figure 2:
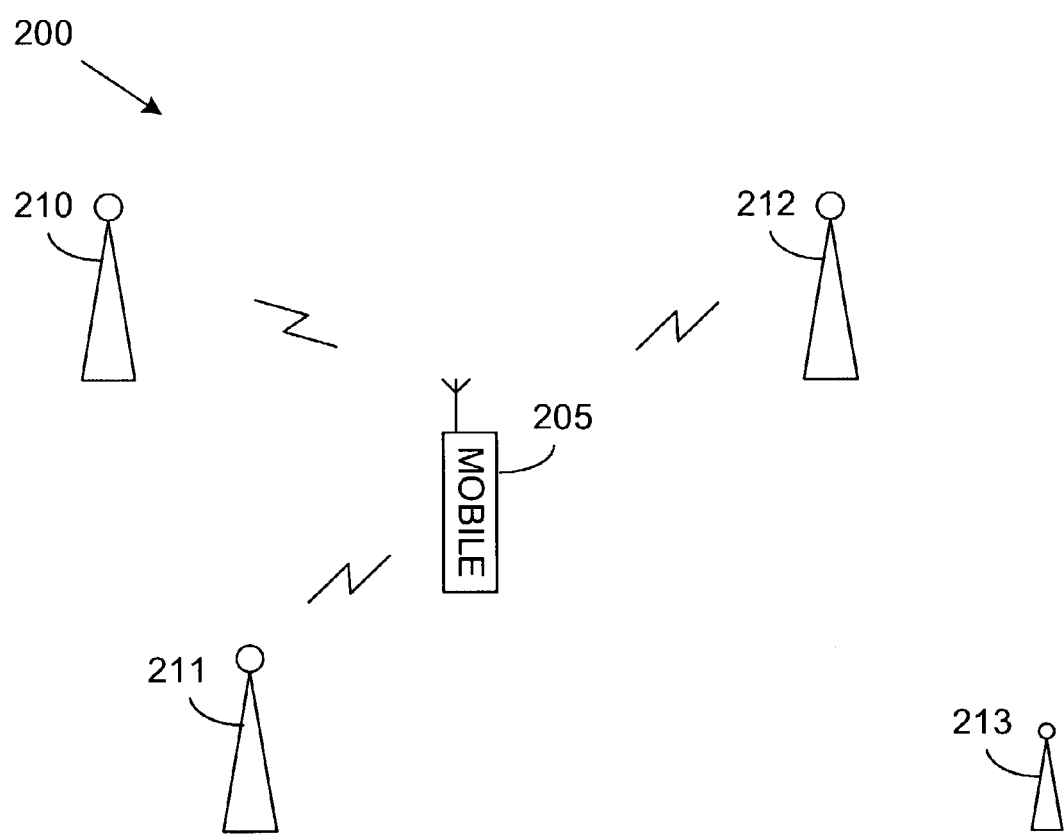
FIG. 2 is a diagram illustrating an exemplary CDMA cellular system wherein a single mobile unit is linked to a plurality of base stations.

With reference to FIG. 2, there is shown a diagram illustrating an exemplary CDMA cellular telephone system 200 with a mobile 205 that has established communications links with three base stations (base stations 210, 211, and 212). The mobile 205 uses all three communications links to help improve the performance of its communications to some device (not shown). The three communications links with the three base stations 210, 211, and 212 are combined to produce a single data stream with better performance characteristics than any one of the communications links alone. The use of multiple communications links in a CDMA cellular system to improve performance is well known by those of ordinary skill in the art of the present invention. A fourth base station 213 is not involved with the mobile 205.

As discussed previously, when a mobile or a base station detects that an existing communications link has degraded below a certain predetermined minimum, the mobile will attempt to drop the link. Of course, if a mobile is only linked to one base station, it will not attempt to drop the link until it has been able to detect a suitable hand-off candidate. As an example, the mobile 205 (as displayed in FIG. 2) may have originally started with a single communications link with base station 211. Then, as the mobile 205 moved in a north-easterly (assuming that north is towards the top of FIG. 2) direction, a one-way hand-off was created with the base station 210 and then finally, a two-way hand-off was created with the base station 212. When a mobile 205 is involved in an N-way hand-off, there is one base station that is referred to as a requested base station and there is one base station that is referred to as a reference base station. The requested base station is the base station that is being added, while the reference base station is the station with which the mobile is obtaining its reference timing information from. Reference timing information is information that is used by the mobile 205 to help it detect and then attempt to hand-off to the requested base station. For example, in the two-way hand-off example above, the requested base station is the base station 212 while the reference base station is the base station 211.

Figure 3A:
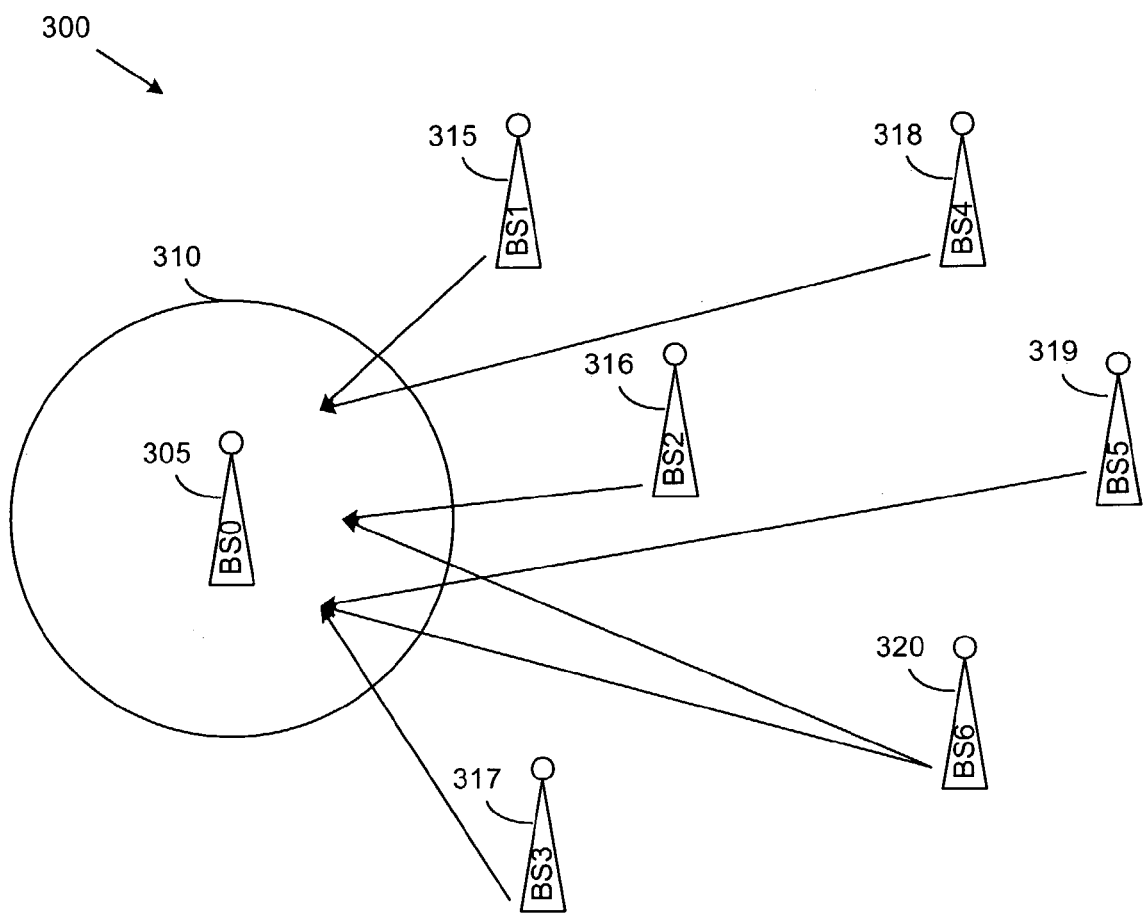
FIGS. 3*a* and 3*b* are diagrams illustrating an exemplary CDMA cellular system and the creation of a neighbor list for one of the base stations in the CDMA cellular system using a prior art technique.

With reference now to FIG. 3a, there is shown a diagram illustrating an exemplary CDMA cellular system 300 with a plurality of base stations and the creation of a neighbor list for a base station 305 (referred to as "BS0") using a prior art technique. As discussed previously, a prior art technique for creating a neighbor list involves placing a detector at various places with the base station BS0's effective coverage area 310 and storing each detected pilot channel as an element of the neighbor list. FIG. 3a displays six additional base stations (base stations 315–320) whose pilot signals are detectable from within the effective coverage area 310 of base station BS0 305.

Figure 3B:
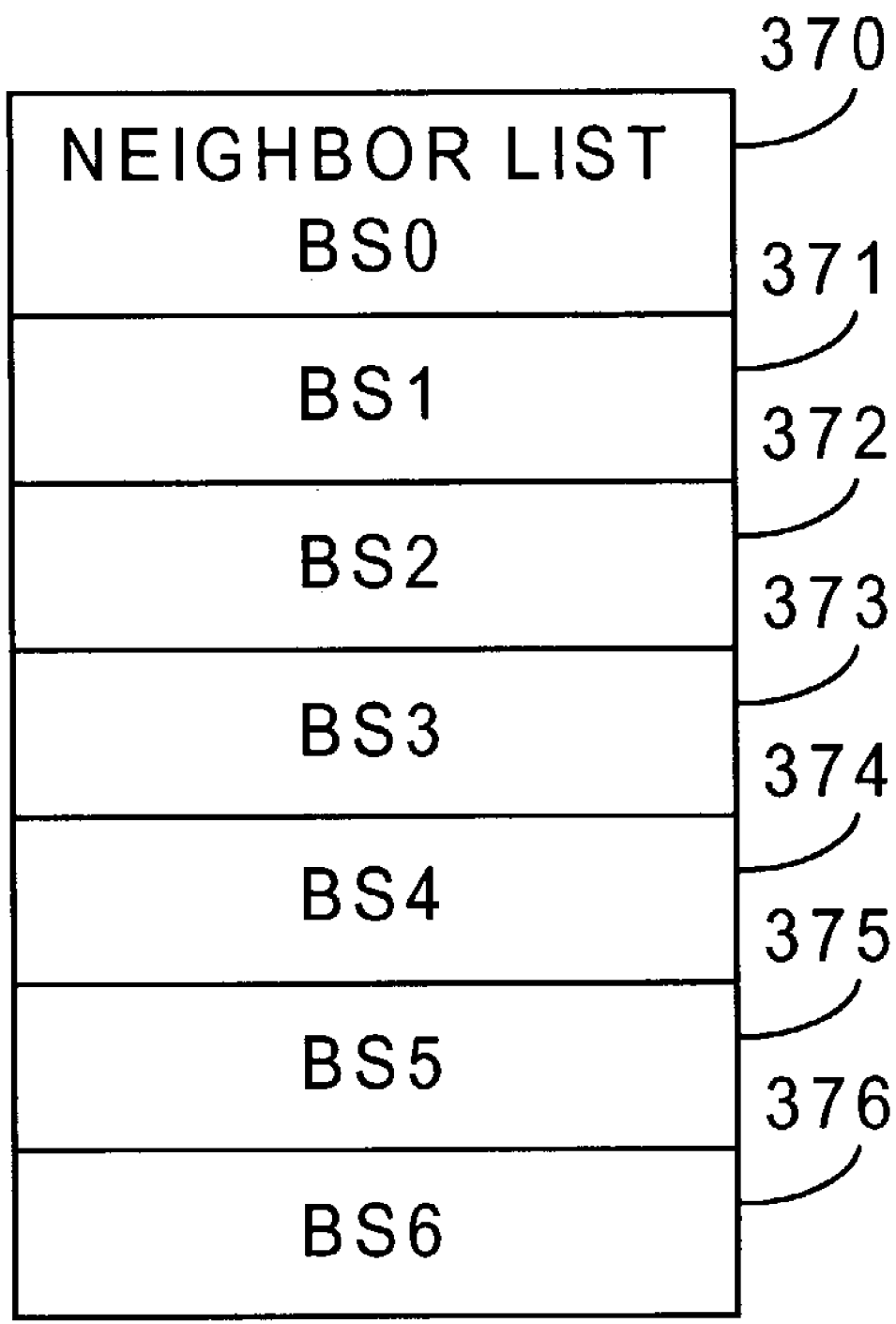

With reference now to FIG. 3b, there is shown a neighbor list 370 for the base station BS0 305 (FIG. 3a). The neighbor list 370 for the base station "BS0" 305 has six elements, one for each of the six base stations whose pilot channel was detected from within the effective coverage area 310 of the base station "BS0" 305. The six base stations are illustrated in FIG. 3a. Ordering of the neighbor list can be performed by some priority assigned to each of the base stations in the neighbor list or it may simply be arbitrary. The ordering of the neighbor list is well understood by those of ordinary skill in the art of the present invention.

A problem with having large neighbor lists at the base stations is that when a mobile is communicating with and through a base station(s), the mobile stores the neighbor list of each base station with which it is communicating. The various neighbor lists are stored in what is known as a composite neighbor list. For example, if a mobile is communicating with a single base station, then only that base station's neighbor list is stored in the mobile's composite neighbor list. However, if a mobile is communicating with a plurality of base stations, for example, three base stations, then the mobile will have to store the entire neighbor list for all three base stations (or up to a storage limit in the mobile) in its composite neighbor list. As discussed above, the elements of the neighbor list that may or may not be stored may be decided arbitrarily, perhaps at the expense of performance.

Figure 4A:
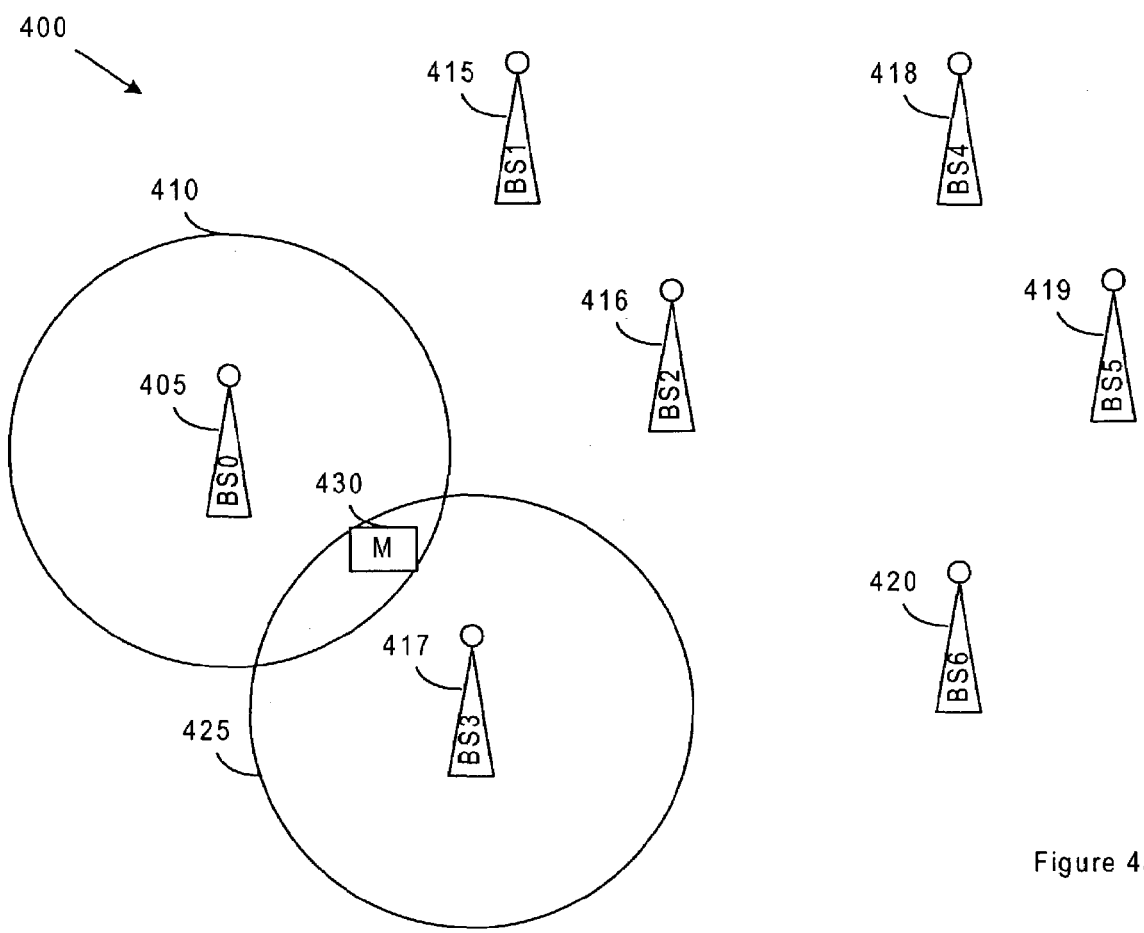
FIGS. 4*a* and 4*b* are diagrams illustrating an exemplary CDMA cellular system wherein a mobile has established communications links with two base stations and the neighbor lists for the two base stations along with a composite neighbor list.
Figure 4B:
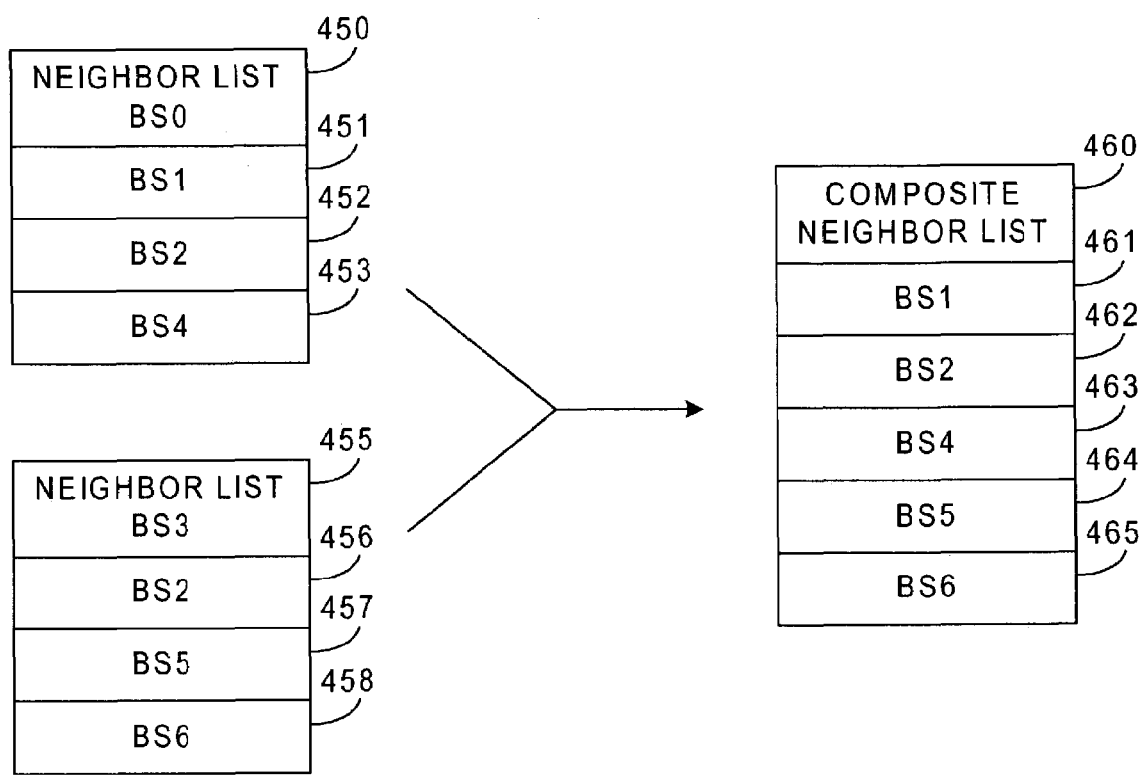

With reference now to FIGS. 4a and 4b, there are shown diagrams illustrating an exemplary CDMA cellular system 400 wherein a mobile 430 has established communications links with a first base station "BS0" 405 and a second base station "BS3" 417 and the neighbor lists for the first (neighbor list 450) and second base (neighbor list 455) stations and a composite neighbor list 460 stored in the mobile 430. Each base station's neighbor list may have been generated using the standard technique of detecting a maximum number of base stations and then placing them in the neighbor list.

As an example, let the neighbor list 450 include base stations "BS1" 415, "BS2" 416, and "BS4" 418 and the neighbor list 455 include base stations "BS2" 416, "BS5" 419, and "BS6" 420. Note that the above neighbor lists (450 and 455) may contain other base stations. Therefore, the composite neighbor list 460, stored in the mobile 430 would at least contain entries for each of the base stations (with the repeated base station "BS2" eliminated). Note that if the size of the composite neighbor list 460 exceeds the storage capacity of the mobile 405, entries would be eliminated.

Furthermore, if the CDMA cellular system 400 is a large system, wherein there are more base stations in the system then available coding sequences, then it is necessary that a single coding sequence be used by several base stations. Normally, this is not a problem because through proper design, the base stations that share the same coding sequence will likely be placed far enough apart so that the likelihood of a mobile being able to detect pilot channels from the base stations using the same coding sequence is highly unlikely.

Unfortunately, the practice of placing as many detectable base stations into a neighbor list may result in having base stations which share a single PN coding sequence in the mobile's composite neighbor list. For example, for illustrative purposes, let "BS1" 415 and "BS5" 419 use the same PN coding sequence. The mobile 430 then will have a composite neighbor list 460 that has two base stations that use a single coding sequence. Then, when the mobile 430 searches for pilot channels to perform a hand-off, it may be able to detect a control channel using the coding sequence in question. Unfortunately, when it looks in its composite neighbor list 460, it will not be able to determine if it has found the control channel of base station "BS1" 415 or "BS5" 419. In this case, the CDMA system 400 would likely tell the mobile 430 to select the first entry in its composite neighbor list 460 ("BS1" 415), which in this example, has a 50-50 chance of being the correct base station. The probability of selecting the correct base station continues to further decrease if more than two base stations share the same PN sequence, with the probability being 1/M, where M is the number of base stations sharing the same PN sequence.

Rather than simply placing every detectable base station in a neighbor list, the neighbor list can be populated depending on hand-offs that have actually been used in the cellular telephone system. A cellular telephone system will typically save data related to every call that is made. This data is commonly referred to as saved call (singular) or a list of saved calls (plural). In some cellular telephone systems, the systems can also be configured to collect other system data beyond simple call data, which can be later analyzed. This saved call data can be parsed to generate the neighbor list for each base station. Because the neighbor list will be created using actual call data, it will likely be more accurate than a neighbor list created from simply detectable pilot channels. Additionally, there is high probability that such a neighbor list will also be smaller than a neighbor list created by detecting pilot channels. Since the saved call data will likely also contain information regarding any hand-offs that occurred during the call, the saved call data is also sometimes referred to as saved hand-off data.

Figure 5A:
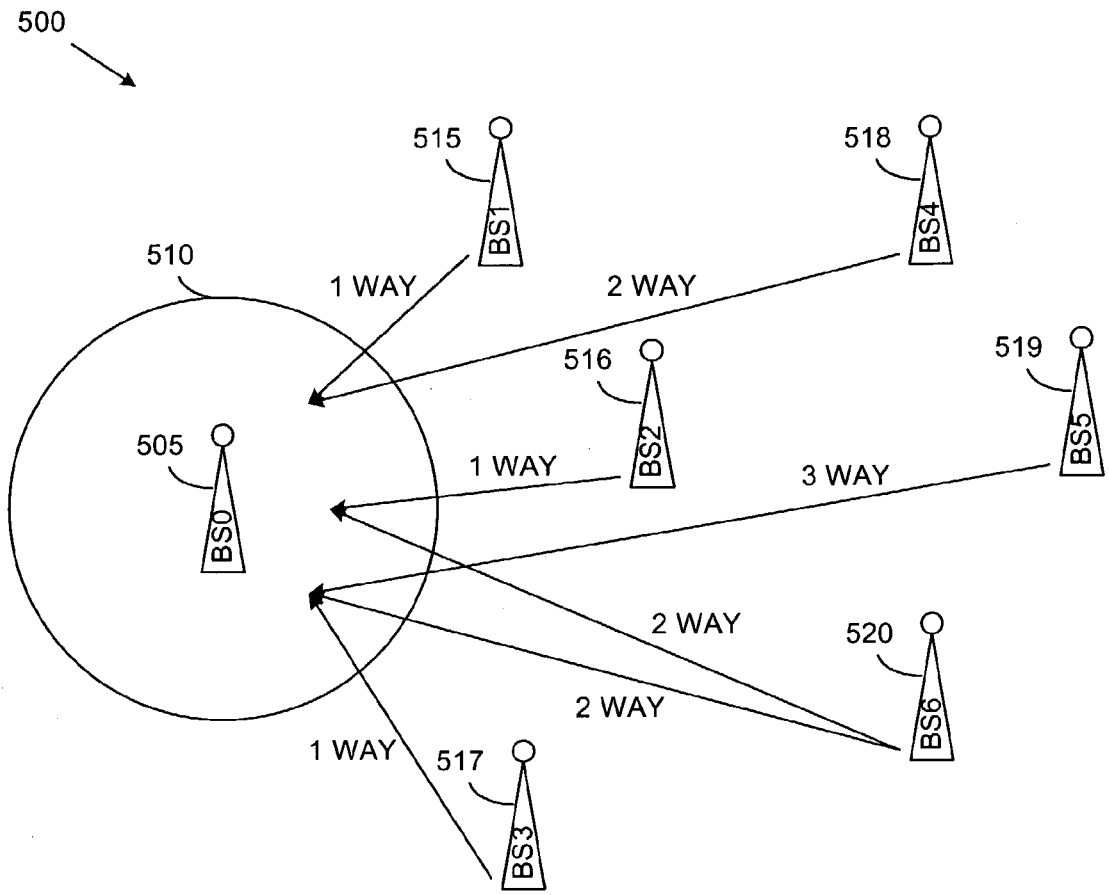
FIGS. 5*a* and 5*b* are diagrams illustrating an exemplary CDMA cellular system with a plurality of N-way hand-offs from a single base station and a creation of a neighbor list from that single base station using a preferred technique of the present invention.

With reference now to FIG. 5a, there is shown an exemplary CDMA cellular system 500, wherein hand-offs from a single base station "BS0" 505 to other base stations are displayed graphically, according to a preferred embodiment of the present invention. There are displayed a series of arrows from other base stations to the base station "BS0" 505. The arrows indicate that a successful hand-off was performed and the order of the hand-off, for example, one-way, two-way, etc. As discussed above, the CDMA cellular system 500 will save the call data and the data can be periodically parsed to maintain the neighbor lists. According to a preferred embodiment of the present invention, the saved call data can be parsed once every week or several weeks in order to maintain the neighbor lists. The amount of time between the parsing of the saved call data may depend on several factors, including (but not limited to): the amount of saved call data that is generated (if too much data is accumulated between each parsing, then the parsing may take an extended amount of time), the performance of the hand-offs (if there are too many failed hand-offs, then the parsing may be performed more frequently to help increase hand-off performance), if a base station is added or removed from the system (changes in the available (and unavailable) base stations need to be reflected in the neighbor list), etc.

For example, the saved call data, when parsed, may show that base stations "BS1" 515, "BS2" 516, and "BS3" 517 were all involved in one-way hand-offs with the base station "BS0" 505. Additionally, base stations "BS4" 518 and "BS6" 520 were involved in two-way hand-offs with the base station "BS0" 505. Finally, base station "BS5" 519 was involved in a three-way hand-off with the base station "BS0" 505. Using the above example, a neighbor list for the base station "BS0" 505 can be created.

Figure 5B:
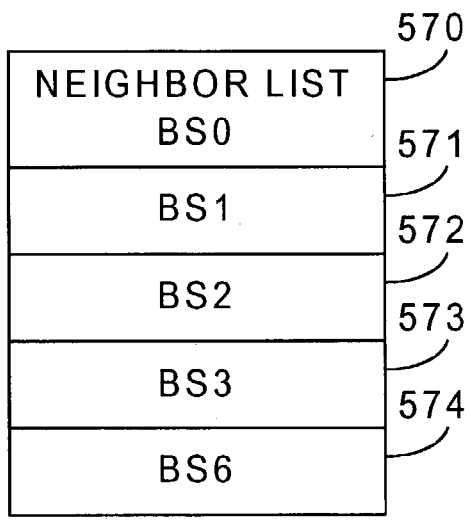

With reference now to FIG. 5b, there is shown a diagram illustrating a neighbor list 570 for the base station "BS0" 505, wherein the neighbor list 570 is created from saved call data, according to a preferred embodiment of the present invention. According to a preferred embodiment of the present invention, the parsing of the saved call data is performed in increasing order of the hand-off. For example, one-way hand-offs are parsed first, followed by two-way hand-offs and so on.

Using the data illustrated in the example above, the creation of the neighbor list 570 is as follows. Start by parsing the one-way hand-offs. The base stations "BS1" 515, "BS2" 516, and "BS3" 517 were all involved in one-way hand-offs with the base station "BS0" 505. Since the neighbor list 570 is initially empty, each one of these three base stations "BS1", "BS2", and "BS3" are added to the neighbor list 570.

Next, the two-way hand-offs are parsed. The base stations "B4" 518 and "B6" 520 were involved in two-way hand-offs with the base station "B0" 505. Suppose that base station "B4" 518 was requested while a mobile was connected to base stations "B0" 505 and "B1" 515. As the neighbor list 570 stands, base station "B4" 518 is not in the neighbor list 570. However, base station "B1" 515 has base station "B4" 518 in its neighbor list, so base station "B4" 518 is not added to the neighbor list 570. Suppose now that base station "B6" 520 was requested while a mobile was connected to base stations "B0" 505 and "B3" 517. Since "B6" 520 is in the neighbor list of "B3" 517, "B6" 520 is not added to the neighbor list 570. Finally, base station "B6" 520 was again requested, but this time, a mobile was connected to base stations "B0" 505 and "B2" 516. Since "B6" 520 is not is the neighbor list of "B2" 516 and the neighbor list 570, it is added to the neighbor list 570.

Finally, the three-way hand-off is parsed. The base station "B5" 519 was involved in a three-way hand-off with the base station "B0" 505. The base station "B5" 519 was requested while a mobile was connected to base stations "B0" 505, "B3" 517, and "B6" 520. Since the base station "B5" 519 is already in the neighbor list of the base station "B6" 520, it is not added to the neighbor list 570.

Note that in this particular example, there are no four-, five-, or six-way hand-offs. Though if there were, saved data corresponding to the four-, five-, and six-way hand-offs would also be parsed and any new base stations would be added to the neighbor list 570. After parsing the saved call data, the neighbor list 570 of the base station "B0" 505 is as displayed in FIG. 5b.

Figure 6A:
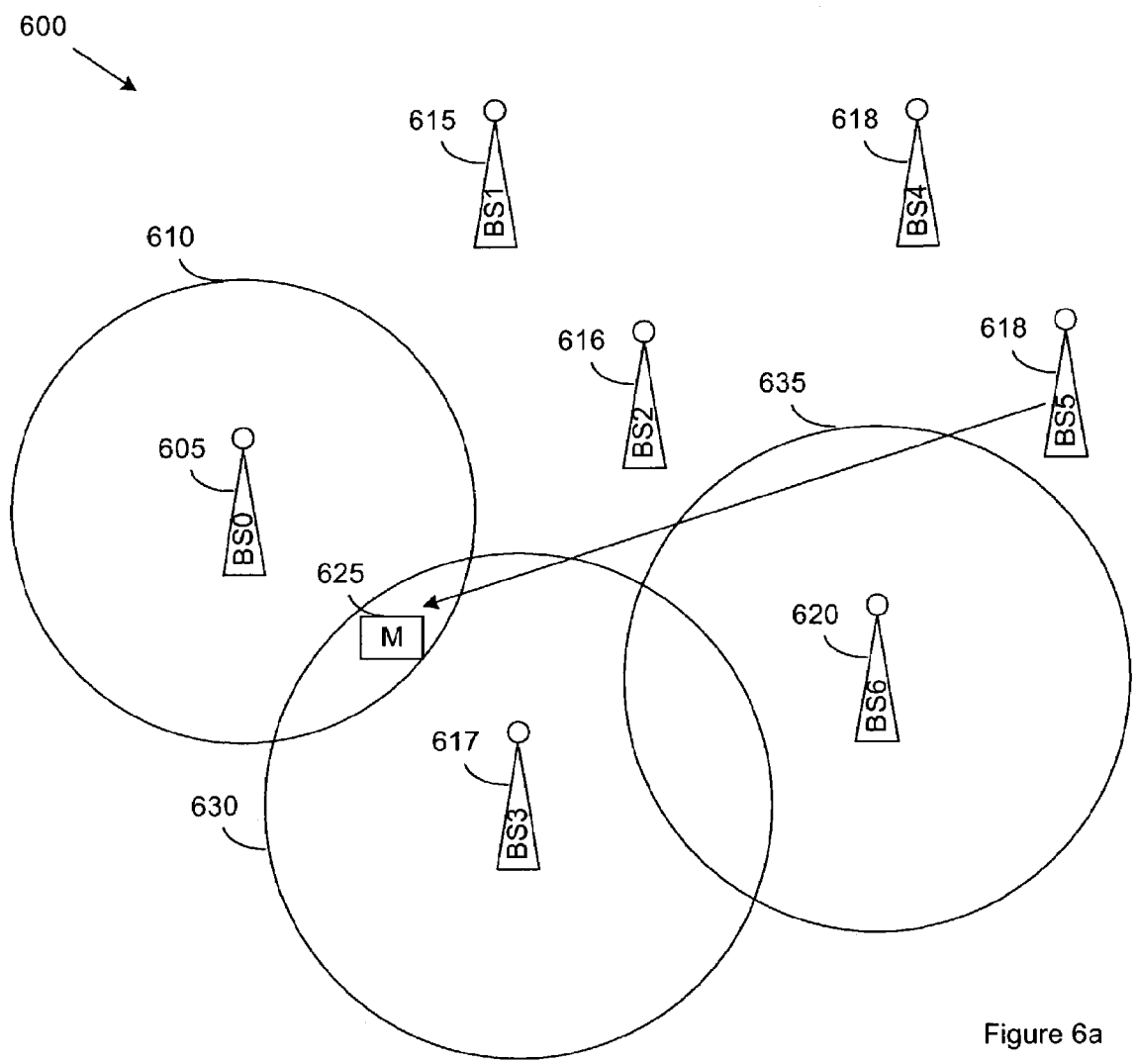
FIGS. 6*a* and 6*b* are diagrams illustrating a three-way hand-off in an exemplary CDMA cellular system and a neighbor list for each base station involved along with a composite neighbor list, wherein the neighbor lists are created using a preferred technique of the present invention.
Figure 6B:
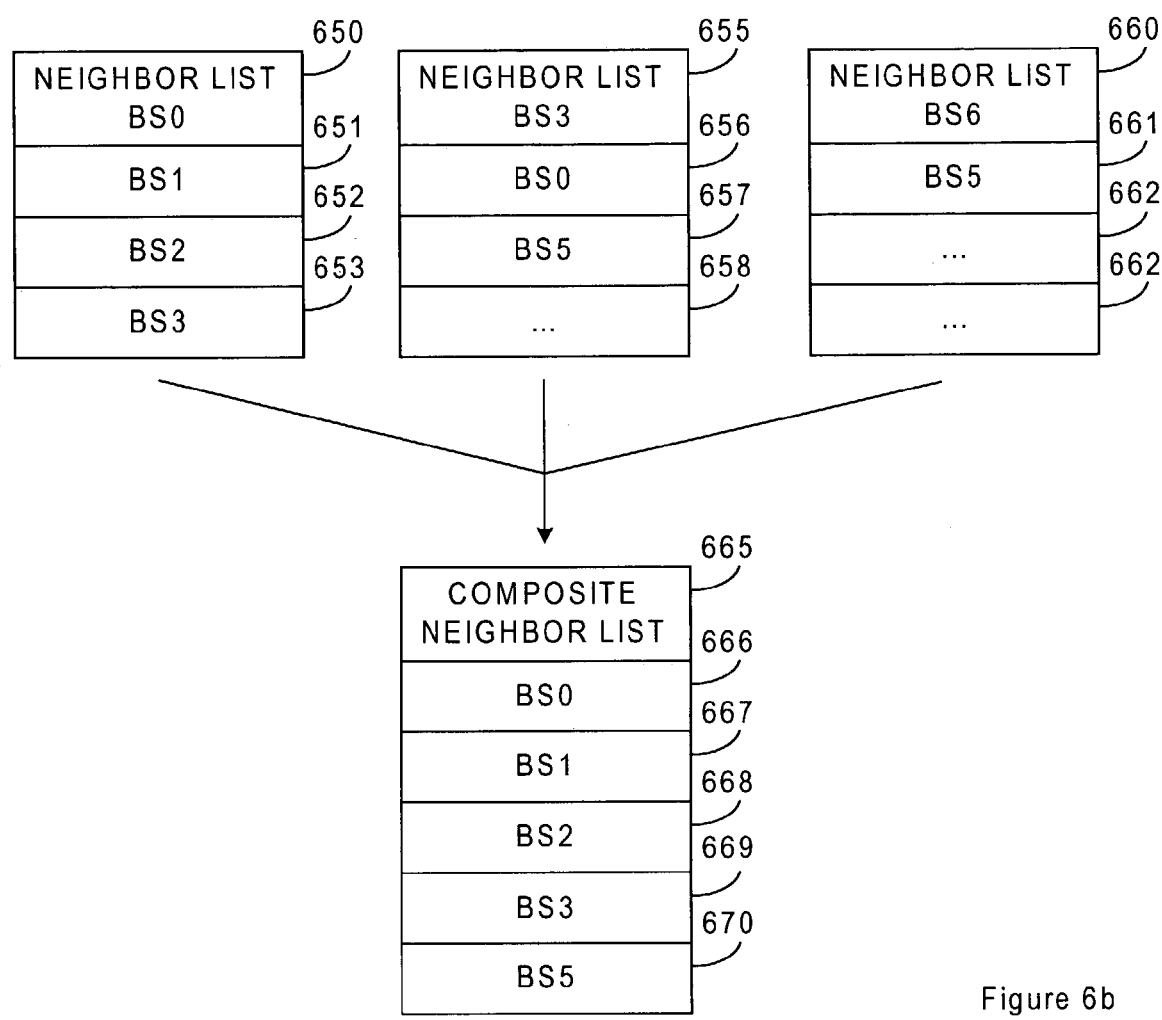

With reference now to FIGS. 6a and 6b, there are shown diagrams illustrating an exemplary CDMA cellular system 600, wherein a mobile 625 takes part in a three-way hand-off, and neighbor lists for each base station involved, including a composite neighbor list 665 located in the mobile 625, according to a preferred embodiment of the present invention. FIG. 6a illustrates an exemplary three-way hand-off wherein a base station "B5" 618 is requested by the mobile 625, which happens to be already linked to three base stations "B0" 605, "B3" 617, and "B6" 620. FIG. 6b displays neighbor lists for each of the three base stations to which the mobile is already linked, neighbor list 650 ("B0"), neighbor list 655 ("B3"), and neighbor list 660 ("B6"). Note that the neighbor lists as displayed may not necessarily be complete. The composite neighbor list 665 represents the composition of the three individual neighbor lists and is stored in the mobile 625.

Note that the composite neighbor list 665 contains the base station "B5" 618, therefore the hand-off would succeed. Additionally, since the base station "B5" 618 is already in the neighbor lists of the base stations "B3" 617 and "B6" 620, the subsequent parsing of the saved call data would not result in the addition of the base station "B5" 618 into the neighbor list 650 of the base station "B0" 605. At least not as the direct result of this particular three-way hand-off, since there are other combinations of base stations that may result in the addition of base station "B5" 618 into the neighbor list 650.

Figure 7:
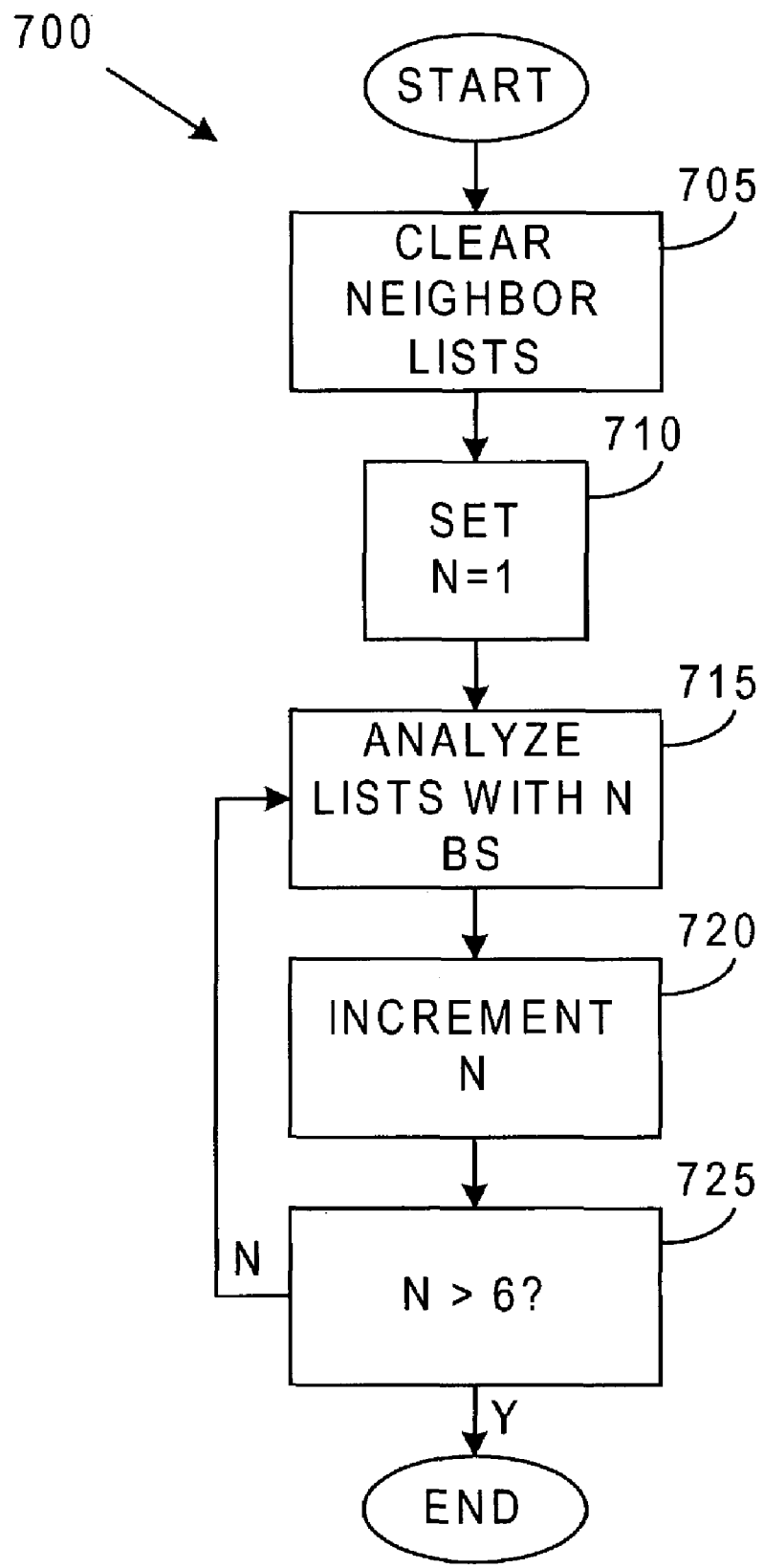
FIG. 7 is a diagram illustrating an algorithm for the creation of a neighbor list, according to a preferred embodiment of the present invention.

With reference now to FIG. 7, there is shown a flow diagram illustrating an algorithm 700 for use the generating neighbor lists for base stations in a CDMA cellular system by parsing through saved call data, according to a preferred embodiment of the present invention. According to a preferred embodiment of the present invention, the algorithm 700 executes on a controller for the CDMA cellular system and controlled by a base station manager (BSM). Alternatively, the algorithm 700 may execute on a remotely connected computer, with the remotely connected computer being connected through a communications link to a controller for the CDMA cellular system, such as an overall CDMA cellular system controller. The BSM may, itself, be a part of an overall CDMA cellular system controller.

According to a preferred embodiment of the present invention, in a typical CDMA cellular system, the neighbor list should be updated once every one or two weeks. This provides a good trade-off in terms of collecting a sufficient amount of call data and not allowing the saved call data to become unmanageably large. Alternatively, the neighbor list can be updated whenever a base station is added or removed from the cellular system. Finally, the neighbor list can be updated whenever the hand-off performance of the cellular system drops below some specified threshold.

When the controller begins execution of the algorithm 700, it preferably starts with an empty neighbor list. By starting with an empty neighbor list, any residual history information regarding past hand-offs which may no longer be accurate (especially when a base station has been removed or added to the cellular system), is eliminated.

According to a preferred embodiment of the present invention, the saved call data contains data in the following format: a reference base station (the base station that the mobile originally established communications with), a requested base station (the base station that is requested to join in the hand-off), a list of other base stations (a list of any other base stations that are a part of the hand-off). Note that the list of other base stations can be empty if the particular hand-off is a one-way hand-off. In general, for an N-way hand-off, the list of other base stations will contain N−1 other base stations.

After clearing the existing neighbor lists, the controller begins to parse the saved call data. To do so, it begins by setting a variable, "N" to one. This signifies that one-way hand-offs will be parsed first. In block 715, the controller performs the analysis of all one-way call data. Once complete, the controller increments "N" (block 720). The controller checks to see if it has analyzed all call data (up to and including six-way hand-offs) (block 725). If it has, then the controller terminates the algorithm 700 and if it has not, the controller returns to block 715 and performs an analysis of the current N-way call data. Note that if the algorithm 700 could-start with N equal to zero and then block 725 would test to see if N was greater than 6. This is solely dependent on where in the algorithm the termination condition (the complete parsing of all N-way hand-offs) is checked and has no bearing on the operation of the algorithm itself.

Figure 8:
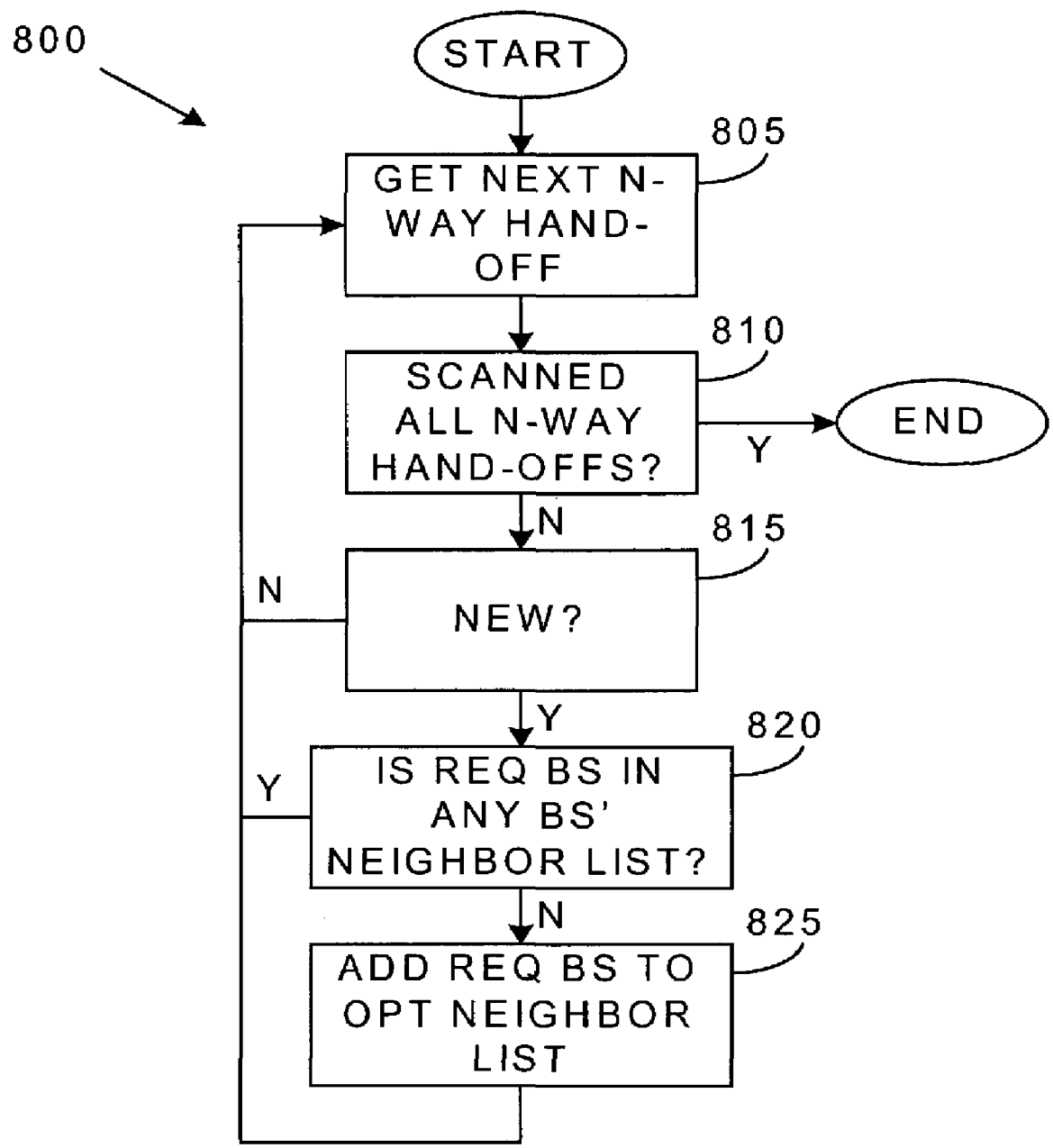
FIG. 8 is a diagram illustrating an algorithm for analyzing saved call data in the generation of a neighbor list, according to a preferred-embodiment of the present invention.

With reference now to FIG. 8, there is shown a flow diagram illustrating a detailed view of an algorithm 800 for the analysis of N-way call data, according to a preferred embodiment of the present invention. Algorithm 800 may be representative of a software routine used to analyze call data, such as in block 715 from FIG. 7. The algorithm 800 would likely execute on the same platform as the algorithm 700 (FIG. 7), such as the controller or the remotely connected computer.

The controller would begin the analysis of N-way hand-off data by retrieving a single piece of N-way call data (block 805). It would check to see if it has analyzed all available N-way call data (block 810). If it has, then the algorithm 800 terminates. If it has not analyzed all of the N-way call data, the controller would check to see if the N-way call data has already been analyzed (block 815). This check may be required because the CDMA cellular system may simply save all call data without checking to see if it has already saved a call involving the same combination of base stations. If the CDMA cellular system does not perform the check, it is likely that a hand-off involving the same set of base stations will appear multiple times in the saved data.

If the N-way call data is new, then the controller will check the neighbor lists of all base stations involved in the hand-off to see if the requested base station is in any of the neighbor lists (block 820). If the requested base station is not in any of the neighbor lists, then the requested base station is added to the neighbor list of an optimal base station in the hand-off (block 825). Note that the optimal base station in the hand-off can be determined in a number of ways, such as, selecting a base station out of the ones that are involved in the hand-off (not necessarily the reference base station) that will result in the smallest composite neighbor list. If the requested base station is in at least one of the neighbor lists, then the requested base station is not added to any neighbor list. The controller returns to block 805 to process additional call data.

Although the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for creating a neighbor list for use in hand-offs in a cellular communications system comprising:
   determining a requested base station from a saved call;
   determining a reference base station from the saved call;
   determining a list of other base stations from the saved call;

determining if the requested base station is present in a neighbor list of a base station listed in the list of other base stations; and adding the requested base station to a neighbor list for the reference base station when the requested base station is absent from neighbor lists of the reference base station and all base stations listed in the list of other base stations.

2. The method of claim 1, wherein the saved call is obtained from a list of saved calls generated during normal use of the cellular communications system, and wherein the method is repeated for each saved call in the list.

3. The method of claim 1, wherein the saved call is obtained from an ordered list of saved calls generated during normal use of a cellular communications system, wherein the ordered list of saved calls is sorted by a number of base stations in the list of other base stations of each saved call, and wherein the method begins with a saved call with a fewest number of other base stations and continues with saved calls with increasing number of other base stations.

4. The method of claim 1, wherein the method is executed at a central processor, wherein a neighbor list is created for each base station, and wherein each of the neighbor lists is delivered to a corresponding base station.

5. The method of claim 4, wherein the central processor is a base station manager (BSM).

6. The method of claim 4, wherein the central processor is a remotely connected computer.

7. The method of claim 4, wherein each base station's neighbor list can be different.

8. The method of claim 1, wherein the cellular communications system is a code-division multiple access (CDMA) cellular communications system.

9. The method of claim 1, wherein the cellular communications system is an IS95 compliant communications system.

10. The method of claim 1, wherein the cellular communications system is an IS2000 compliant communications system.

11. The method of claim 1, wherein the method is executed periodically to generate up-to-date neighbor lists.

12. The method of claim 1, wherein the addition of the requested base station to the optimal base station's neighbor list results in a minimally sized composite neighbor list.

13. A method for optimizing a neighbor list comprising:
selecting a saved call from a list of saved calls;
determining a requested base station from the saved call;
determining a reference base station from the saved call;
determining a list of other base stations from the saved call;

determining if the requested base station is present in a neighbor list of a base stations listed in the list of other base stations;

adding the requested base station to a neighbor list for the reference base station when the requested base station is absent from neighbor lists of the reference base station and all base stations listed in the list of other base stations; and repeating for all remaining saved calls in the list of saved calls.

14. The method of claim 13, wherein the list of saved calls contains saved calls listing N other base stations, wherein N is a number from one (1) to six (6).

15. The method of claim 14 further comprising after the repeating:
incrementing N;
obtaining an additional list of saved calls, wherein the additional list of saved calls contains only saved calls listing N base stations;
repeating the selecting, two determining, adding, and first repeating for the additional list of saved calls.

16. The method of claim 15, wherein the method is repeated until N is equal to six (6).

17. The method of claim 13, wherein a neighbor list is created for each base station in a cellular communications system, and wherein the method further comprises sending to each base station its neighbor list.

18. A method for populating a neighbor list comprising:
determining a requested base station from call data,
determining a reference base station from the call data,
determining a list of other base stations from the call data;
searching each base station's neighbor list for an occurrence of the requested base station, wherein each base station is from the list of other base stations;
searching the reference base station's neighbor list for an occurrence of the requested base station; and
adding the requested base station to the reference base station's neighbor list when all searches are negative.

19. The method of claim 18, wherein if any of the searches is positive, the method is stopped.

20. The method of claim 18, wherein when added to the reference base station's neighbor list, a position of the requested base station in the reference base station's neighbor list is based on an identifier of the requested base station.

21. The method of claim 18, wherein the method is repeated for all available call data.

* * * * *